May 31, 1960 E. J. NICHOLL 2,938,684
AIRCRAFT RETRACTABLE UNDERCARRIAGE
Filed July 1, 1957 3 Sheets-Sheet 1

INVENTOR
Edward J. Nicholl
BY
Reynolds, Beach & Christensen
ATTORNEYS

May 31, 1960 E. J. NICHOLL 2,938,684
AIRCRAFT RETRACTABLE UNDERCARRIAGE
Filed July 1, 1957 3 Sheets-Sheet 2

INVENTOR
Edward J. Nicholl
BY
Reynolds, Beeche & Christensen
ATTORNEYS

May 31, 1960 E. J. NICHOLL 2,938,684
AIRCRAFT RETRACTABLE UNDERCARRIAGE
Filed July 1, 1957 3 Sheets-Sheet 3
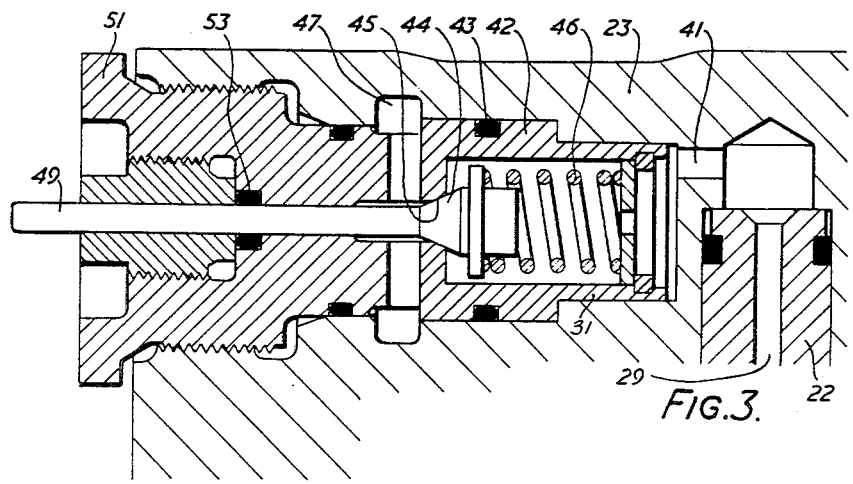
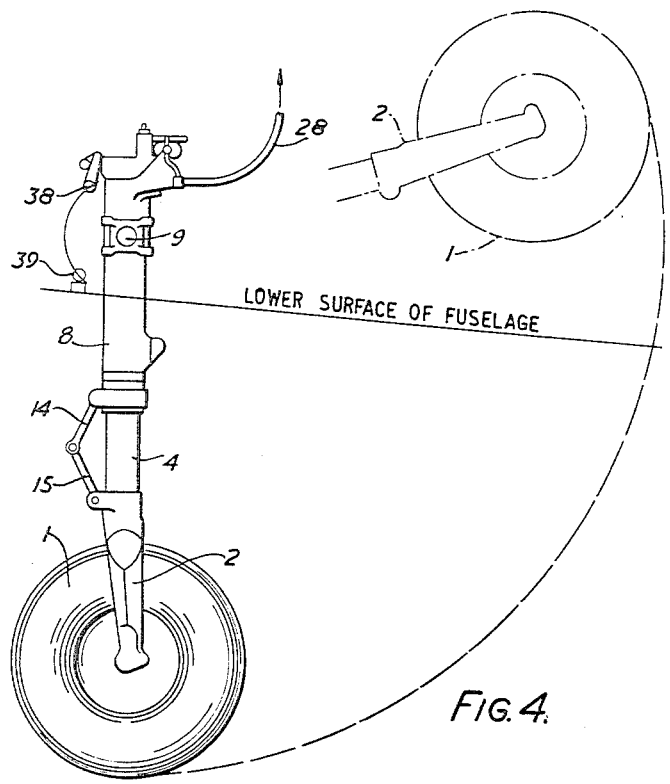
INVENTOR
Edward J. Nicholl
BY Reynolds, Beeh & Christen
ATTORNEYS United States Patent Office 2,938,684
Patented May 31, 1960

2,938,684

AIRCRAFT RETRACTABLE UNDERCARRIAGE

Edward J. Nicholl, Charlton Kings, Cheltenham, England, assignor to Dowty Equipment Limited, Cheltenham, England Filed July 1, 1957, Ser. No. 669,097

Claims priority, application Great Britain July 3, 1956

6 Claims. (Cl. 244—102)

This invention relates to aircraft retractable undercarriages which incorporate one or more liquid springs as shock absorbers. A preferred form of liquid spring for use in an aircraft undercarriage and incorporating vibration damping means is disclosed in U.S. Patents Nos. 2,346,667, 2,333,095 and 2,333,096 issued to George H. Dowty, of common ownership herewith. In principle a liquid spring comprises a closed chamber entirely filled with liquid into which a plunger is movable in sealed manner to compress the liquid when a load is applied, the rate of the spring so formed depending among other things on the compressibility of the liquid, the cross-section of the plunger and the volume of the chamber. A practical difficulty involved with liquid springs is the variation of volume of liquid in the container with variation in temperature and within the extremes of atmospheric temperature met with by an aircraft there would be a considerable change in length of a liquid spring if the quantity of liquid enclosed were constant. It is impossible to select a liquid having a low temperature coefficient of expansion since the compressibility would then be too low because of the fact that for all liquids the ratio of compressibility to temperature coefficient is substantially constant.

It has been previously proposed in British Patent No. 685,469, of common ownership herewith, to overcome this difficulty by connecting the liquid spring chamber permanently to a source of hydraulic pressure in the aircraft through a surge valve which is spring loaded to an open position to allow slow flow of liquid when the pressure prevailing in the liquid spring chamber is lower or very slightly higher than the pressure of the source. In normal temperature conditions if the aircraft is not loaded, the lighter weight on the liquid spring might not be sufficient to close the surge valve thus allowing slow escape of liquid and collapse of the liquid spring. Still further if the ambient temperature rises whilst the aircraft is on the ground the liquid may expand to close the surge valve positively and to expand the spring against its outer stops so that it cannot act as a spring. This condition will remain until the temperature of the spring drops. If in this time the aircraft were to take off and land, then serious damage might be caused to the aircraft on landing.

The present invention has for its object to provide an alternative solution to overcome the difficulties above-mentioned and also to arrange that under all circumstances when an aircraft is preparing to land that the liquid spring is correctly pressurized to act as a spring.

The present invention comprises basically the provision, in an aircraft having a liquid spring forming part of a retractable undercarriage, of a valve in a connection from a hydraulic pressure source in the aircraft to the liquid spring chamber and means for positively opening the valve by the action of retracting the undercarriage. By this means the liquid spring chamber is filled with liquid at the correct pressure during each period of undercarriage retraction and when the undercarriage is lowered the spring is perfectly prepared for its shock absorbing function. It will be appreciated that on retraction and opening of the valve some liquid may leave the liquid spring due to the possible presence of an excessively high pressure.

One example of the invention for use as a castoring retractable nosewheel of an aircraft will now be described with reference to the accompanying drawings, in which:

Figure 3 is a detailed cross-sectional view of the recuperator valve shown on small scale in Figure 2, and Figure 4 is an elevation showing the location of the undercarriage on the aircraft in its extended and retracted positions.

Figure 1:
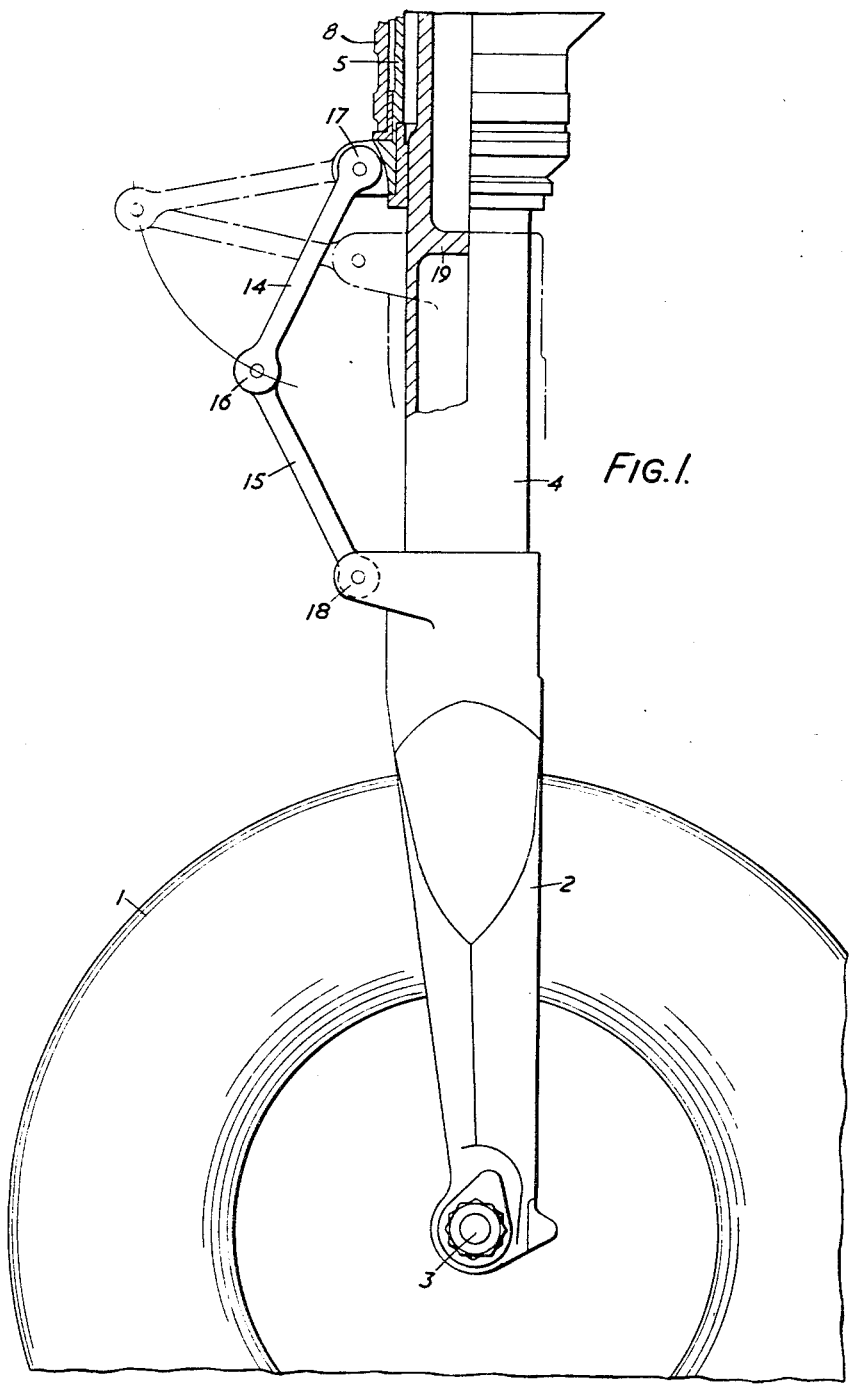
Figure 1 is an elevation of the lower end of the nosewheel undercarriage.
Figure 2:
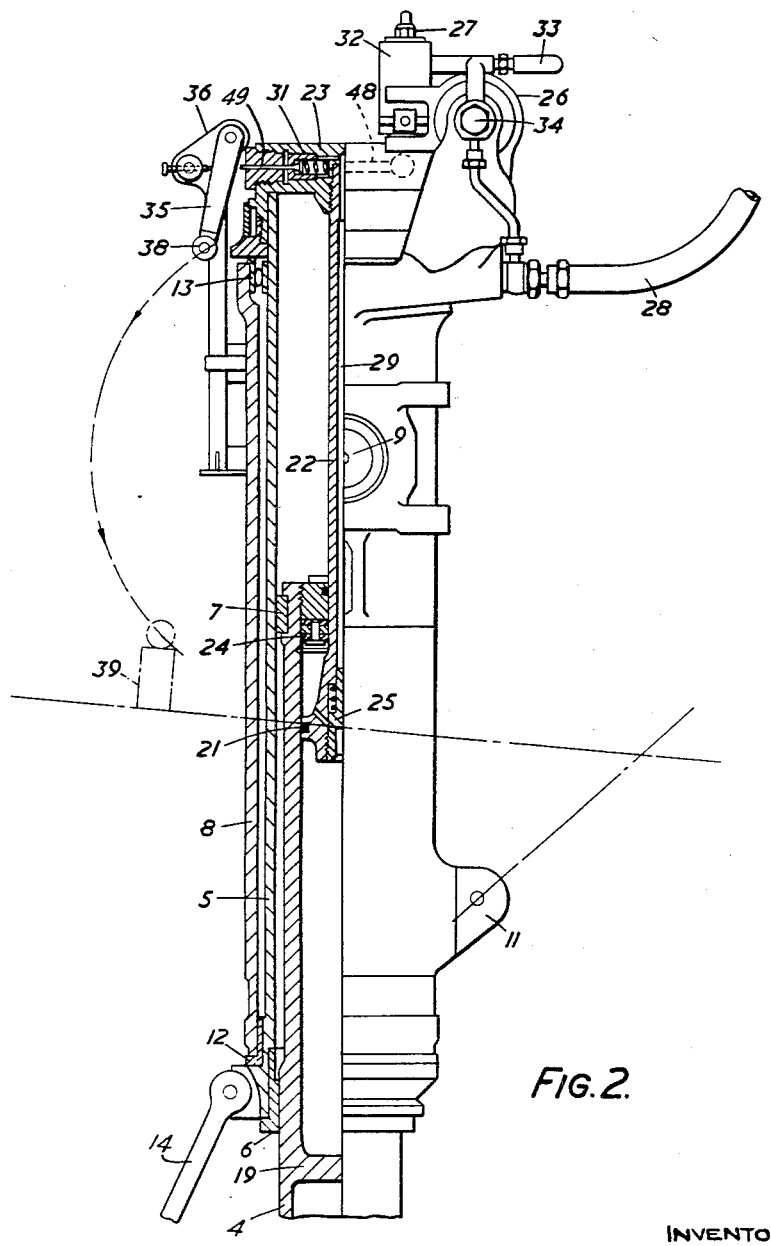
Figure 2 is an elevation partly in section continuing from Figure 1 and showing the upper portion of the nosewheel undercarriage.

Referring now to Figures 1 and 2, the ground-engaging wheel is indicated at 1 and is carried at the lower part of the undercarriage by means of a fork 2 and an axle 3 locked in the ends of the fork. The fork is secured to the end of a cylindrical sliding member 4 which is slidable within a tubular member 5. Rings of anti-friction metal 6 and 7 secured one to the lower end of the tubular member 5 and the other to the top of the cylinder 4 ensure friction-free sliding motion of the cylinder 4 within tubular member 5. The tubular member 5 is rotatably carried within an outer tubular member 8 which in turn is carried by supports in the aircraft on trunnions 9. The outer tubular member 8 is secured in position in the aircraft in the extended or the retracted position by means of a hydraulic jack (not shown) pivotally secured to lug 11 and extending back into the aircraft. The tubular member 5 is rotatably mounted within the tubular member 8 by means of an anti-friction thrust bearing 12 at the lower end of member 8 and needle roller bearings 13 at the upper end of member 8. In order that the cylinder 4 may be secured to rotate with the tubular member 5 torque links 14 and 15 are provided which are pivoted together at position 16 and to the tubular member 5 and the fork 2 at positions 17 and 18 respectively.

The cylinder 4 forms the cylinder of a liquid spring and in order to isolate a sufficient volume of this cylinder for use as the liquid spring cylinder a transverse wall 19 is provided interiorly of the cylinder 4. Within the upper part of cylinder 4 a piston 21 is located which is carried by a piston rod 22 which extends through the top of the cylinder 4 and is secured to the upper end wall 23 of the tubular member 5. A differential area seal 24 of the kind disclosed in prior Patent No. 2,308,149 is located at the upper end of cylinder 4 and seals against the piston rod 22 to prevent escape of liquid from the cylinder 4.

The spring effect of the undercarriage through which the weight of the aircraft is supported is obtained by the entry of the piston rod 22 into the cylinder 4 and the compression of the liquid trapped in the cylinder 4. The function of the piston 21 is that of an energy dissipator in that as the piston rod 22 enters cylinder 4 liquid is allowed to pass from one side of the piston to the other in a restricted manner by virtue of spring-loaded valve means 25 of known type located within the piston. In the obtaining of springing movement the piston rod 22 is fixed relatively to the aircraft whilst the cylinder 4 which carries the ground-engaging wheel moves relatively thereto. In order to obtain castoring movement of the ground-engaging wheel the tubular member 5 which carries the liquid spring and the ground-engaging wheel is arranged to be rotatable within the tubular member 8. Damping of such castoring movement is provided by means of a damping unit 26 which is fixedly secured to the tubular member 8 at the upper end thereof and operates on an eccentric pin 27 secured to the upper end wall 23 of the tubular member 5. The damping unit 26 is of a known type employing liquid as a damping medium and which requires to be pressurised from the aircraft hydraulic system. Such a pressure connection is obtained by the flexible hose 28 which extends from the undercarriage to a fixed part of the aircraft. The castering action obtained allows complete rotation about the castoring axis.

Liquid springs for correct operation need to be filled, when not externally loaded, with liquid at a pressure of about 2,000 lbs. per sq. in. which is conveniently obtained in the case of an aircraft undercarriage from the normal aircraft hydraulic supply. As previously mentioned the liquid within a liquid spring cannot be isolated since its volume varies with temperature and the operation of the spring would then vary with the ambient temperature. In the present example of the invention the interior of the liquid spring cylinder 4 is connected to the hydraulic system of the aircraft by means of a hollow passage 29 extending axially through piston rod 22, a non-return valve designated generally by the numeral 31, formed in the upper end wall 23, a hydraulic swivel coupling conveniently formed by the eccentric pin 27 and the sleeve 32 which surrounds it and is connected to the damping unit 26 and a flexible pipe 33 extending from the sleeve 32 and connected to the hydraulic connection 34 of the damping unit 26, this latter connection 34 being connected to the aircraft hydraulic supply by means of the flexible hose 28 previously referred to. The function of the non-return valve 31 is to isolate the interior of the liquid spring at all times when the aircraft weight is exerted on the wheel 1 and it is so arranged that pressure within the cylinder 4 will operate to close this non-return valve. In accordance with the invention arrangements are made to positively open the non-return valve on retraction of the undercarriage, this being accomplished by means of a lever 35 pivotally secured to a support 36 carried by the tubular member 8 and being capable when depressed of acting on the stem 49 which extends from the non-return valve 31. The lever 35 is arranged for depression automatically when the undercarriage reaches its fully retracted position by the engagement of a roller 38 located at the end of the lever on a structural member 39 of the aircraft. In Figure 2 and in Figure 4 the curved path of the roller 38 is shown during retraction and it will be seen that as retraction is completed then the non-return valve 31 is opened.

Figure 3 shows in detail the construction of the non-return valve. The end of the piston rod 22 enters into the upper wall 23 and communication from the axial bore 29 to the non-return valve is obtained by a passage 41. The valve seat is in the form of an insert 42 into a bore in the wall 23 sealed by means of a sealing ring 43. The valve member includes a conical head 44 seating in a hole 45 in the seat member 42 and pressed against this seat by means of a helical spring 46. Liquid which passes the valve seat enters into a space 47 which is in connection with the passage 48 in the wall 23 which leads to a passage formed in the eccentric pin 27, and so to the pressure fluid supply hose 28. A stem 49 extends from the valve head 44 through a screw-threaded bush 51 which retains the whole valve in position. The stem 49 is sealed within the bush 51 by means of a sealing ring 53.

When the undercarriage described is mounted on the aircraft and is in the lowered position it will be seen that spring 46 incorporated in the non-return valve 31 will close such valve, whereby the interior of the liquid spring cylinder 4 is isolated and the liquid spring may act as such by compression of the liquid contained therein. During taxiing of the aircraft the whole liquid spring units as mounted in the tubular member 5 in addition to vertical shock absorbing movement may move angularly for castoring, these movements being damped by the unit 26 acting through the eccentric pin 27. When the aircraft takes off the damping unit 26 automatically centres the inner tubular member 5 and the landing wheel 1 which it carries thereby bringing the stem 49 of the non-return valve opposite to the lever 35 carried by the outer tubular member 8. When the undercarriage is retracted by movement about the trunnions 9 the lever 35 will be depressed on completion of the retraction movement thereby connecting the interior of the liquid spring cylinder 4 to the aircraft hydraulic system. Whilst the aircraft is in the air whatever ambient temperature changes may occur the liquid within the cylinder 4 will be pressurised to the pressure of the aircraft hydraulic system and only when the undercarriage is lowered for landing is the interior of the cylinder isolated. Thus, on landing the liquid spring is correctly primed so that it may operate efficiently as a spring. Whilst the aircraft is on the ground the liquid contained within the liquid spring cylinder is completely isolated and it is impossible for liquid within the cylinder 4 to escape and allow collapse of the spring.

I claim as my invention:

1. In combination with the relatively movable upper fixed member and lower movable member of an aircraft undercarriage and interposed chamber and plunger means constituting a liquid spring, means for mounting the fixed undercarriage member for retraction upon and relative to the aircraft structure, conduit means affording access of hydraulic fluid from a source at substantially constant elevated pressure to said chamber, valve means interposed in said conduit means and arranged to be normally closed against escape of fluid from within the chamber, and means fixed relative to the locus of said valve means during retractive movement of the undercarriage, and positioned to be engaged by and to open said valve means upon such retraction, for free communication in either direction between the conduit means and the chamber while the undercarriage is retracted, to maintain the elevated source pressure within the liquid spring.

2. The combination as claimed in claim 1, wherein the valve means is a non-return valve biased to allow normal liquid flow only into the liquid spring.

3. The combination of claim 2, wherein the valve means includes an external valve-lifting element, and a movable valve-operating element mounted upon and movable during retraction with the undercarriage in a locus to engage and be moved by the fixed valve-opening means, said undercarriage-mounted valve-operating element being arranged to engage and actuate the valve-lifting element upon its engagement by the fixed valve-opening means.

4. The combination as claimed in claim 3 including a ground-engaging element directly carried by the liquid spring which latter is arranged with its axis substantially vertical in the lowered undercarriage position for angular movement about this axis, and means to control the angular position of the liquid spring about its axis, which control means includes a hydraulic passage extending from the conduit means to the liquid spring.

5. In combination in an aircraft, a hollow support member having means to mount it on the aircraft for angular retracting movement about a horizontal axis, a liquid spring mounted for angular movement within the support member about an axis perpendicular to the horizontal axis, a ground-engaging element carried by the lower end of the liquid spring, a control unit mounted externally on the support member, an eccentric pin secured for angular movement with the liquid spring about such perpendicular axis, a sleeve encircling the pin, and connected to said control unit for control of the angular position of the liquid spring, a non-return valve mounted on the liquid spring and connected to the interior of the latter, and arranged normally to prevent liquid flow from the liquid spring, passages from the non-return valve passing through the eccentric pin and the sleeve, conduit means extending from the liquid spring by way of such passage for connection to a source of liquid pressure, a stem extending from the non-return valve, a lever mounted on the support member in position to engage the stem, and a fixed member on the aircraft for engagement by the lever upon completion of retracting movement of the hollow support member and the liquid spring and ground-engaging element carried thereby, to depress the stem and open the non-return valve and to connect the interior of the liquid spring to the liquid pressure source for liquid flow in either direction.

6. The combination as claimed in claim 5, wherein the control unit comprises a vibration damper biassed to the central position so that it always tends to centralize the ground-engaging element and to bring the stem of the non-return valve opposite to the lever.

References Cited in the file of this patent

UNITED STATES PATENTS

| | | |
|---|---|---|
| 2,092,662 | Weymouth | Sept. 7, 1937 |
| 2,543,233 | Dowty | Feb. 27, 1951 |

FOREIGN PATENTS

| | | |
|---|---|---|
| 685,469 | Great Britain | Jan. 7, 1953 |